United States Patent [19]

Wijangco

[11] Patent Number: 4,633,089
[45] Date of Patent: Dec. 30, 1986

[54] HAND HELD RADIATION DETECTOR

[75] Inventor: Antonio Wijangco, Forest Hills, N.Y.

[73] Assignee: Life Codes Corp., Elmsford, N.Y.

[21] Appl. No.: 606,623

[22] Filed: May 3, 1984

[51] Int. Cl.$^4$ ............................................. G01T 1/18
[52] U.S. Cl. ...................................... 250/374; 313/93
[58] Field of Search ........................... 250/374; 313/93

[56] References Cited

U.S. PATENT DOCUMENTS

| | | | |
|---|---|---|---|
| 2,917,647 | 12/1959 | Fowler et al. | 250/374 |
| 3,344,302 | 9/1967 | Engh et al. | 250/374 |
| 3,424,936 | 1/1969 | Osa et al. | 313/93 |
| 4,501,988 | 2/1985 | Mitrofanov | 250/374 |

OTHER PUBLICATIONS

Fujita et al. "Low Level Needle Counter Nuclear Instr. & Meth. 128 (1975) No. 3, p. 523.
Ivliev et al. "Prop. Counter for a Measure of Small Quantities of 14C" Inst & Exper. Techniques U.SSR vol. 17, No. 3, pt 1, p. 688 (1974).

Primary Examiner—Bruce C. Anderson
Assistant Examiner—Richard Hanig
Attorney, Agent, or Firm—John F. Ohlandt

[57] ABSTRACT

A hand-held radiation detector for measuring localized radiation at extremely low levels of the order of 1 CPM (counts per minute); an anode is provided in the form of a needle within a sealed chamber defined by a generally cylindrical housing having a metallized radiation window on one end; a focusing arrangement is utilized which enables efficient focusing of the electric field, such that avalanche and efficient electron multiplication occurs within the chamber responsive to the localized radiation entering the chamber, the focusing arrangement including (1) a needle point design to concentrate electric field lines on and in the immediate vicinity of the point, (2) a judiciously selected location for the needle at a sufficient distance from the radiation window such that the electric field lines emanating from the window are forced into the amplifying region (AR) of the needle, and (3) a suitably configured cathode defined by the radiation entrance window and the upper conducting tubular member of the housing, whereby the electric field lines from the conducting tubular member of the housing push the electric field lines for the edge of the window into the amplifying region of the needle point.

7 Claims, 4 Drawing Figures

HAND HELD RADIATION DETECTOR

BACKGROUND OF THE INVENTION

1. Field of the Invention

This invention pertains to the field of radiation measurement and more particularly, to a radiation detector and an associated method for accurately determining the location of, and measuring the degree of, very low level radiation.

2. Background Information

The current state of the art in radiation detectors may be considered first with respect to existing hand-held radiation detectors which are mainly manufactured for field survey use or to monitor radioactive spills or contamination. Because of these objectives, such existing detectors have been designed with a large sensitive area, and the need for sensitivity to very minute amounts of radioactivity is not very critical. Also, such detectors, being designed to be sensitive to radiation arriving at the sensitive area from all directions, give only a very rough idea of source location.

The context of the present invention is the field of biological studies, and for such purposes the need for high sensitivity and good localization is very important. Many times in such biological studies or experiments, one has only a minute amount of samples, or the biological samples can only tolerate or incorporate a small amount of radioactive labels or traces. In such cases, high sensitivity is clearly necessary. Moreover, adequate spatial resolution is required, for example, to localize radioactive lines in biology experiments like Southern blotting or hybrid-dots.

Accordingly, it is a primary object of the present invention to provide a hand-held radiation detector with sufficient spatial resolution.

An accompanying object is to provide such radiation detector which additionally possesses a high degree of sensitivity.

In fulfillment of the above stated objects, the primary feature of the present invention resides in a unique field focusing arrangement which results in a high uniform sensitivity over the entire entrance window of the chamber. This advantageous result is achieved because of three significant parameters that have been judiciously selected: the design of the point of the needle; the anode in the form of such needle has been situated or disposed a suitable distance from the radiation window; and a metallic tubular member, which defines the upper part of the radiation detector housing, is in contact with the metallized portion of the radiation window. Together, the metallic tubular member and metallized window portion form the cathode.

The electric field lines from the central region of the entrance window connect with the part of the point of the needle called the amplifying region (AR). Without the conducting tubular member, electric field lines emanating near the edge of the metallized window, i.e., away from the center of the window, would normally fall outside the amplifying region (AR) of the needle, and therefore be away from the point of the needle and along the body of the needle. Because of the conducting tubular member, the electric field lines from that tubular member push the electric field lines from the edge of the window into the region (AR) of the needle. As a result of this bunching of the electric field lines from the total area of the entrance window into the amplifying region (AR) of the needle, the chamber has uniform sensitivity over all the surface area of the window. If the needle were to be positioned too close to the window, the field lines from the tubular member would redistribute themselves along the body of the needle and the field from the edge of the window would also move away from the region (AR) of the needle. If the needle were to be positioned too far from the window, the electrons released by the radiation to be counted will have a long drift path to the region (AR) of the needle. The longer the drift path, the less likely the electrons will survive the trip to the needle, and the efficiency of the chamber will decrease. The high efficiency of the chamber is achieved by the optimum positioning of the needle with respect to the window, as will be explained herein. Consequently the drift path from the window to the needle is minimized, and one still has all the field lines from the window falling into the amplifying region (AR) of the needle.

The gas combination has also been chosen to optimize the efficiency of the chamber. Argon was chosen as the main gas because it is easily ionized by the incoming radiation but it is very stable because it is a noble gas. However, argon alone is not sufficient because when electrons multiply and avalanche in the field (AR) of the needle, a copious amount of X-rays are produced which can interact somewhere in the chamber and initiate another avalanche thereby giving spurious counts. To correct this unwanted effect, a small amount of quenching agent is added, in this case carbon-dioxide gas ($CO_2$). The ratio found for optimum performance was argon (90-95%) and $CO_2$ (5-10%) by volume.

It should be pointed out, in order to place the invention in its proper context and to provide background information that will enable full appreciation of the invention, that there has been prior knowledge with respect to needle counters or detectors. For example, reference may be made to (I) Y. Fuchita et al "Nuclear Instruments and Methods" 128, 523 (1975). Such article describes what is referred to as a "small" gas-flow type Geiger counter, which is cylindrical in shape and has a needle-tip (anode) against an end-window plane (cathode), and was developed particularly for low level, beta counting of solid sources.

The end window therein comprises a gold-plated mylar film, and the needle is surrounded by an insulating tube with the tip projecting beyond the tube end into the open space of the chamber. A high voltage connector is connected to the assembly, which includes a copper body, and a gas inlet and outlet passageways are provided for continuous flow of gas into and out of the detector.

Although the electric field configuration within the chamber of the Fujita device is not specifically illustrated in the referenced article, it will be understood that a large fraction of the field lines end up at the side of the needle. Consequently, electrons following these field lines will not avalanche sufficiently to produce the desired electron multiplication which is necessary to achieve sufficient sensitivity for the purposes already described.

It should also be especially noted that the chamber in the Fujita et al device is operated in the Geiger-Muller mode using an He-isobutane gas mixture. As a result of operation in this Geiger-Muller mode, the dead time of the chamber is about one millisecond. Consequently, a source which has more than 60,000 DPM (decays per minute) cannot be read accurately by this type of detector.

Another reference that may be useful as background material is an article by C. Grunberg and J. LeDevehat, NUCLEAR INSTRUMENTS AND METHODS, 118 (1974), pages 457 to 463. Described therein is a multi-needle detector designed to give two-dimensional position information. However, the described detector does not have a means for focusing the field so as to achieve sufficient electron amplification or multiplication. Its electric field configuration may be appreciated, for example, by referring to FIG. 4 of the article. As indicated in the explanation of FIG. 4, which is a view of the multiplication area in the needle chamber, only a part of the electric field lines are in the multiplication bulk, so that an efficiency loss occurs.

A third reference that may be referred to for background information is an article by G. Comby et al, NUCLEAR INSTRUMENTS AND METHODS, 174, 77 (1980) pages 77-92. Such article is primarily concerned with applications of a multineedle detector. However, there is disclosed an elementary detector, which is referred to as a ring counter. This ring counter is depicted in FIG. 1A of this article and apparently involves a disc-like cathode for the purpose of focusing the electric field lines.

Accordingly, whatever the merits of the several reference detectors discussed above, they do not provide for the efficient electron multiplication obtained by the present invention and, therefore, are not suitable or appropriate for the purpose of biological studies involving measurement of very low level radiation.

SUMMARY OF THE INVENTION

In complete fulfillment of the previously stated objects, the present invention, based upon the primary feature discussed, can be considered as the combination comprising: a housing including two engaged tubular parts or members, one of the parts being entirely insulative, the other part having an axially extending, metallic ring or tubular member; a radiation window extending across the upper end of the metallic tubular member, such window including a metallic portion which is an electrical contact with the tubular member; a sealed chamber defined by the housing, the chamber being filled with a gas; an especially designed and located needle within the chamber serving as an anode, the tubular member and the metallic portion of the radiation window together serving as the cathode.

With this combination of elements, an electric field is produced by connecting a voltage between the anode and the cathode. Efficient focusing of the electric field is achieved by reason of the needle being located such that the amplifying region, which immediately surrounds the point of the needle, is at a distance whereby the electric field lines emanating from the radiation window are forced into said amplifying region. Moreover, since the cathode is also defined by the axially extending metallic tubular member, this acts to push the electric field lines emanating from the edge of the radiation window, into the amplifying region. Consequently, highly efficient electron multiplication and, hence, improved electron collection, occurs responsive to radiation entering the chamber.

BRIEF DESCRIPTION OF DRAWING

FIG. 2B, in particular, depicts the preferred schematic arrangement in accordance with the present invention.

DESCRIPTION OF PREFERRED EMBODIMENT

Figure 1:
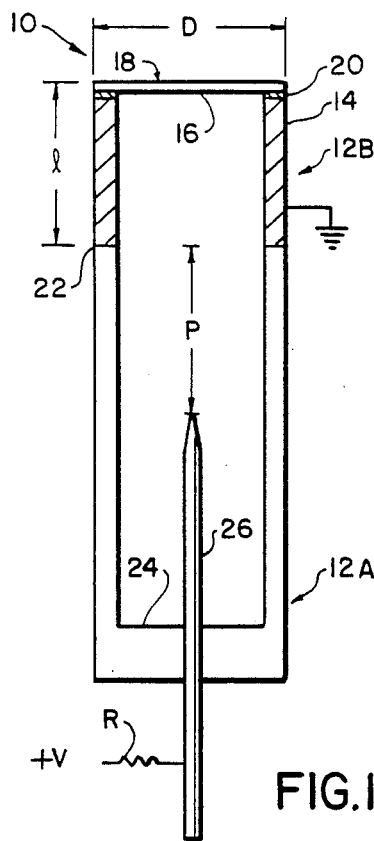
FIG. 1 is an axial cross-sectional view of the detector device in accordance with a preferred embodiment of the present invention.

Referring now to the figures of the drawing, and particularly to FIG. 1 thereof, there will be seen in cross section a radiation detector device in accordance with the present invention. The detector 10 includes a housing having a longitudinal axis along which two engaged parts or members 12A and 12B extend. The part 12A is composed of insulative material, whereas the part 12B, which functions as the cathode of the detector, comprises a metallic tubular member 14, sometimes referred to as a conducting metal ring. Such ring is in electrical contact at its upper end with the metallized inner surface 16 of a mica window 18 functioning as the radiation conducting window for the detector. This window 18 is bonded with conducting epoxy material 20 to the upper end of ring 14 and, in turn, this ring is bonded at its lower end to the insulative part 12A of the housing by suitable epoxy material 22.

Accordingly, the housing, comprising the two parts 12A and 12B, defines a sealed chamber 24 which contains a counting gas, preferably argon (95% by volume) and $CO_2$ (5% by volume). A needle 26 serves as the anode of the detector. In order to provide the requisite electric field, a voltage source $+V$ is connected by way of the resistor R to the needle 26. The tubular member or ring 14 is connected to ground potential, as will be seen in FIG. 1.

In order to maximize sensitivity of the detector, the aforenoted gaseous medium is sealed by means of a very thin non-porous window 18. The thinner the window, the more chance a low-energy alpha and beta particle can penetrate through without losing all of its energy in the window material. However, the window cannot be too thin because the counting gas would then leak out, or contaminating external gases would be permitted to seep in. For this reason, the mica window 18 is approximately 0.001 inches thick.

In operation of the radiation detector 10, an alpha or beta particle penetrating the window 18 will ionize the counting gas along its path. In the case of gamma rays, there is, first, a conversion into a photoelectron and then the photoelectron ionizes the gas along its path. Usually the number of electrons in the ionization trail is not enough to be detected by conventional electronic amplifying devices so that the electron number needs to be multiplied to reach the sensitivity of the amplifier.

Figure 2A:
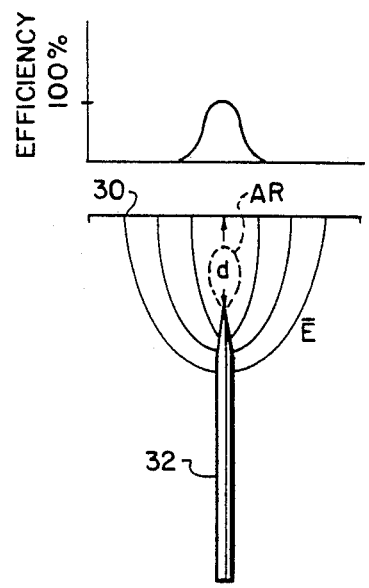
FIGS. 2A and 2B are schematic diagrams illustrating different electric fields configurations which result in different efficiencies in electron multiplication.

Referring now to FIG. 2A, it will be appreciated that what is depicted here is a typical conventional configuration of electric field lines $\overline{E}$ in the situation where a relatively small gap d exists between the cathode, schematically represented by the line 30, and the needle 32 serving as anode. A multiplying or amplifying region AR is seen surrounding the tip of the needle 32. Only electrons following the field lines that go into the amplifying region (AR) of the needle undergo multiplication sufficiently. Electrons that happen to be released away from the center of the cathode follow the field lines that fall outside the region (AR) and as such do not undergo multiplication and are not counted. This accounts for the efficiency curve depicted on top of FIG. 2A.

Figure 2B:
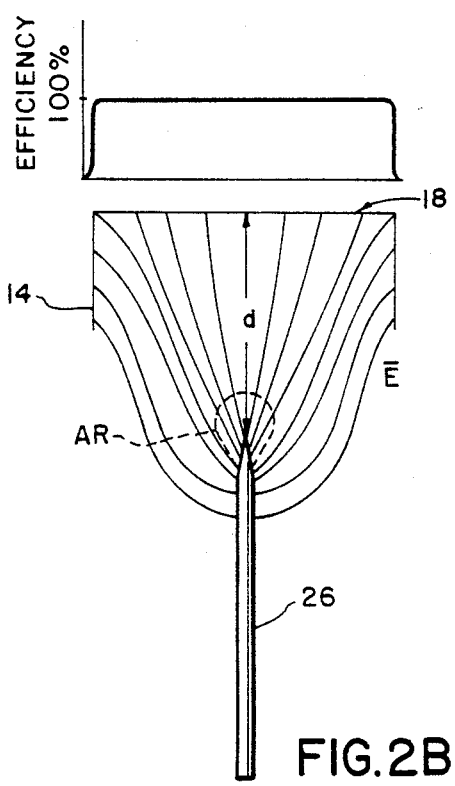

In contrast to FIG. 2A, FIG. 2B represents the improvement in electric field lines reconfiguration provided by the concept of the present invention. This improvement is based on the recognition that by providing an extra conductor along the edge of the conducting window 18, (in the form of the axially extending conducting tubular member or ring 14), the electric field lines emanating from the tubular member push the electric field lines emanating from the edge of the window 18 from the side of the needle into the amplifying region AR of the needle. (See FIG. 2B.) Because all the electric field lines from the window 18 now all fall into the region AR of the needle, the counting efficiency over the total area of the window is optimized as shown by the efficiency curve above FIG. 2B.

It will, of course, be understood that the ionization electrons follow the electric field lines until they reach the amplifying region AR. In such region, the electrons are pulled along by such very high electric fields that they experience inelastic collisions with other atoms, thereby releasing more electrons which in turn release other electrons so that an avalanche of electrons follow. It will also be appreciated that the detector gain is adjusted by varying the voltage applied between the needle or anode 26 and the ring 14, such gain usually being adjusted so that it is between $10^3$ and $10^7$.

The distance d of the needle 26 seen in FIG. 2B has been selected such that the ionization electrons have a large probability of surviving the trip to the region AR. However, if d were to be made too long, the electron survival rate would diminish significantly.

Referring now to FIG. 1, it will be understood that the entrance window diameter D is selected to be approximately 0.25 inches based upon what biologists generally use. For example, they use containers having a 0.25 inch diameter. Such a diameter is also adequate for the lines on so-called Southern blots. The length 1 for the tubular member or ring 14 is also selected to be approximately 0.25 inches. This length is arrived at because the electrons from radioactive $P_{32}$ have a range of 0.25 inches in the argon-$CO_2$ gas mixture already specified.

As already explained in connection with FIG. 2B, the needle 26 is located at a point at which maximum efficiency is attained; that is, for having the ionization electrons falling into the region AR of the needle. The total distance d from the radiation window that was found to be optimum in accordance with the present invention, corresponds with having the point of the needle 26 at a distance p from the lower end of the ring 14. This dimension is approximately ⅜ inches for optimum efficiency; however, one-quarter inch will also work quite well.

Summarizing the above selection of dimensions, it can be said that the empirically derived relational formula for reasonable efficiency is that the diameter (D) should be approximately equal to the length (1) of the ring 14 which, in turn, should be approximately equal to the distance (p) from the lower end of that ring to the point of the needle 26.

Also, it should be noted that the gas employed, that is the counting gas as specified previously, has been chosen such that the ionization electrons have a good probability of making it to the region AR. However, also mixed into the gas is a quenching agent ($CO_2$, 5% by volume), so that the gas does not self-ignite or experience runaway counting after the passage of an alpha, beta or gamma ray.

In order to enable the man skilled in the art to implement in some detail the detector of the present invention, the following information, based on a prototype, is provided:

The value of V+ is typically selected to be 1.7 kilovolts; however, as already indicated, by varying this voltage, higher or lower gain within the limits previously prescribed may be achieved.

Figure 3:
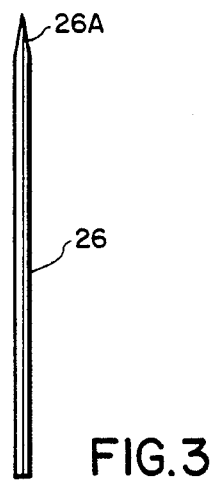
FIG. 3 shows the specific design of the needle.

Referring to FIG. 3, the needle 26 is shown therein as four times its actual size. It will be noted that the diameter of the needle is selected to be approximately 0.020 inches (No. 76 wire); moreover, the material is type 410 stainless steel hardened and drawn to RC 40–45. The length of the needle is selected to be 0.750 (plus or minus 0.005) inches. The point of the needle is in the form of a 32 RMS cone having an apex angle of approximately 20°. It should be noted that this cone 26A must have a well defined point, that is to say, it must be flat on the point tip, not to exceed 0.0005 inches in diameter.

The ring 14 is selected to be constituted of any metal that is a good conductor. The insulative cup-shaped part 12A is selected to be of pyrex glass or ceramic, and the window 18 is metallized mica.

It will be understood by those skilled in the art that, for the purpose of measuring the flow of collected electrons resulting from the operation of detector 10 responsive to radiation, suitable electronic means (not shown) can be connected. Thus, by means of a high impedance voltmeter placed across resistor R (seen in FIG. 1), the current flow as a result of the collection of electrons in the detector, will serve as a measure of the received radiation.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

I claim:

1. A hand-held radiation detector for measuring localized radiation at extremely low levels, the detector comprising:
    a housing including two peripherally engaged, axially extending, tubular members, one of said members being entirely insulative, the other of said members being metallic;
    a radiation window at one end of said metallic tubular member, said window including a metallic portion in electrical contact with said metallic tubular member;
    a sealed chamber defined by said housing, said chamber being filled with gas;
    a needle within said chamber serving as an anode, said metallic tubular member and the metallic portion of said radiation window serving as a cathode;
    a voltage means connected between said anode and cathode;
    the point of the needle being located entirely within the portion of the chamber defined by said insulative tubular member and axially spaced from the other end of said metallic tubular member such that the electric field lines emanating from the radiation window, including those at the periphery, are forced into the amplifying region, which immediately surrounds the point of said needle, whereby efficient electron multiplication occurs responsive to radiation entering said chamber.

2. A device as defined in claim 1, in which said two engaged tubular members are sealed together at their opposed ends; said radiation window being sealed to the upper end of said metallic tubular member.

3. A device as defined in claim 1, in which the diameter of said metallic tubular member, the length of said metallic tubular member, and the distance of the point of said needle from the other end of said metallic tubular member, are all approximately equal.

4. A device as defined in claim 3, in which all of the recited dimensions are approximately 0.25 inches.

5. A device as defined in claim 1, in which said gas is a combination of argon, 95% by volume, and carbon dioxide, 5% by volume.

6. A device as defined in claim 1, in which said voltage means has a voltage of approximately 1.7 KV.

7. A device as defined in claim 4 in which the point of said needle is in the form of a 32 RMS cone having an apex angle of approximately 20°.

* * * * *